Patented June 3, 1930

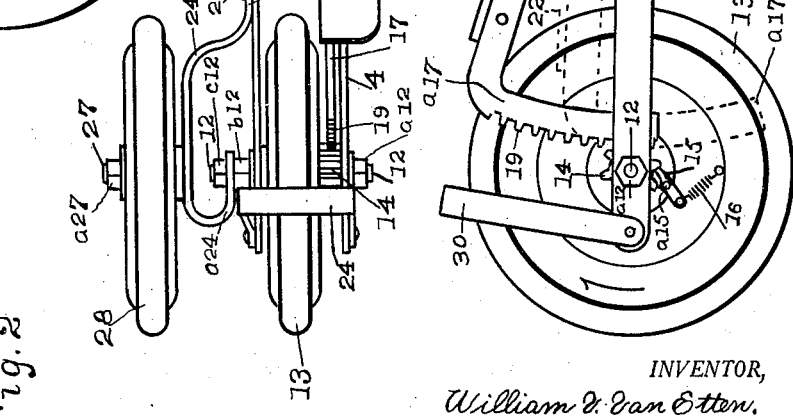

1,761,601

UNITED STATES PATENT OFFICE

WILLIAM V. VAN ETTEN, OF BELLINGHAM, WASHINGTON, ASSIGNOR TO HI-POWER MANUFACTURING COMPANY, OF SEATTLE, WASHINGTON, A CORPORATION

FOOT-POWER SCOOTER

Application filed January 26, 1929. Serial No. 335,172.

My invention relates to improvements in foot-power scooters and is an improvement on an invention of similar character for which I have applied for Letters Patent, Serial No. 302,313, filed Aug. 27, 1928, and has for an object to provide a scooter having a pivoted driving member. Another object of my improvement is to provide a scooter having simple means to fasten on a third wheel. Other objects of my improvement will appear as the description proceeds.

I attain these and other objects of my improvement with the mechanism illustrated in the accompanying sheet of drawings, which form a part of this specification, in which Figue 1 is a front side elevation of my power scooter, Fig. 2 is a plan view of Fig. 1 with the front end of the machine broken away and Fig. 3 is a front elevation of the third wheel mounted on the frame member by which it is fastened to the main frame shown as disconnected therefrom.

With more particular reference to the designated parts: 4 and 5 are the main frame members which are at their front ends fastened to head bearing 6. Head frame 7 has bearing brackets 8, 8 fastened thereto with bearing 6 intervening and king pin 9 is extended through registering holes in said bearing and brackets. Handle bar $a^7$ is fastened to the upper end of head frame 7 and in the lower ends of said head frame is fastened axle 10 on which is mounted front wheel 11 for revolution.

Rear axle 12 is fastened to the rear ends of main frame bars 4, 5 in aligned holes therethrough by clamping nuts $a^{12}$ and $b^{12}$ and on axle 12 is mounted rear drive wheel 13 loose for revolution. Also on axle 12 pinion gear 14 is mounted loose for revolution between wheel 13 and frame bar 4. Pawl 15 is pivoted to wheel 13 on pin $a^{15}$ disposed for engagement with pinion 14 against which it is held with resilient pressure by spring 16 fastened thereto and to said wheel. The front end of driving member 17 is pivoted to frame bar 4 at 18 and its rear end is a circular arc $a^{17}$ about pivot 18. In the external edge of arc $a^{17}$ are teeth 19 engaged with pinion 14. Guide and stop 20 is a loop the upper ends of which are pivoted to drive bar 7 and the lower end enfolds frame bar 4 to stop the upward movements of drive bar 17 within operative limits and guide the oscillations of said bar relative to frame bar 4.

Coil spring 21 is concentric with pivot 18 and its end $a^{21}$ is fastened to frame bar 4 while its end $b^{21}$ is fastened to drive bar 17, and it reacts to force said drive bar to its upper oscillatory limit.

Pedal plate 22 is fastened to the upper edge of drive bar 17, and foot plate 23 is fastened to frame bars 4 and 5. Back stand 30 is pivoted to the rear ends of frame bars 4 and 5 as usual.

Third-wheel bar 24 has its rear end looped at $a^{24}$ and in the end thereof is slotted hole 26. The front end of bar 24 is bent to lie in front of loop $a^{24}$ and extended forward at $b^{24}$ and has forward slot 25 communicating with hole $a^{25}$ therethrough. Axle 27 is fastened to bar 24 and on it is mounted for revolution third wheel 28 retained in place by nut $a^{27}$. Headed stud 29 is fastened to frame bar 5. The back end of axle 12 protrudes beyond nut $b^{12}$ and it is extended through slot 26 in the rear end of bar 24 when said bar is moved endwise forward while stud head 29 is extended through hole $a^{25}$ in the front end of said bar. Then the bar with the wheel thereon is moved rearward to engage slot 25 beneath stud head 29 and nut $c^{12}$ is engaged with the back end of axle 12 and screwed down on to the bar end to clamp the same to the axle. In this way third wheel 28 becomes a part of the vehicle preferably with axle 27 in line with axle 12. It easily follows that frame bar 24 is easily removed by the reverse of the process last above described. When the power scooter is used by children of small size or by those who are inexperienced in its use third wheel 28 may be desired as it provides a stable vehicle. But for those who are larger or familiar with its use this wheel is not required and may be readily removed as described.

In using this power scooter the left foot is placed on foot plate 23, handle bar $a^7$ is grasped by the hands and the right foot is placed on pedal plate 22, which is forced downward thereby against the power of spring 21 to, say, its dotted position at 22′ and arc $a^{17}$ has been moved downward to its position at $a^{17\prime}$. During this downward movement rack teeth 19 have caused pinion gear 14 to revolve forward thus causing drive wheel 13 also to revolve forward, by the engagement of pawl 15, which moves the vehicle forward. Then by relieving the foot pressure on pedal 22 the driving member is returned upward to its full-line position by the reaction of spring 21 which movement causes teeth 19 to revolve pinion gear 14 in the reverse direction, but this movement of said gear does not effect the forward revolution of drive wheel 13 because pawl 15 does not engage said pinion during its reverse revolution. Therefore the forward movement of the scooter caused by the described downward foot movement is maintained by momentum during the upward return movement of the driving segment, which when completed, may receive another downward thrust from the rider's foot causing gear 14 to resume its forward rotation with the consequent forward drive of wheel 13 through pawl 15 and pin $a^{15}$. The repetition of downward thrusts of the rider's foot with the intervening return upward of the drive segment due to the reaction of spring 21 provides a convenient and effective means of applying driving power to the scooter.

In practice it has been found that with little experience a youth may ride and drive this scooter with ease without third wheel 28. But for the small or inexperienced rider the addition of the third wheel provides a safe and easy foot-power vehicle.

Having thus disclosed my invention, what I claim as new therein and desire to secure by Letters Patent is:—

A foot-power scooter consisting of a steering wheel, a driving wheel, a third wheel, a main frame of front and rear parts connected by a hinge, an axle fastened to said front part of said main frame to mount said steering wheel for revolution, an axle fastened to said rear part of said main frame to mount said driving wheel for revolution, a foot plate fastened to said rear part of said main frame, a frame attachment removably fastened to said rear part of said main frame, an axle fastened to said frame attachment to mount said third wheel for revolution, a pinion gear mounted on said driving-wheel axle for revolution, a gear segment pivoted to said rear part of said main frame for oscillation in power-transmission and return strokes engaged with said pinion gear to drive the same forward by said power-transmission strokes, a pedal plate fastened to said gear segment, means to guide and limit the said oscillations of said gear segment, means to cause said return strokes of said power segment, and a pawl pivoted to said driving wheel engageable by said pinion gear only during the said forward revolution thereof.

WILLIAM V. VAN ETTEN.